US009165450B1

(12) United States Patent
Sorensen

(10) Patent No.: US 9,165,450 B1
(45) Date of Patent: Oct. 20, 2015

(54) VEHICLE WITH MOVEMENT SENSOR

(71) Applicant: International Truck Intellectual Property Company, LLC, Lisle, IL (US)

(72) Inventor: Tom Lee Sorensen, Naperville, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/293,406

(22) Filed: Jun. 2, 2014

(51) Int. Cl.
  G08B 21/02 (2006.01)
  B60R 16/02 (2006.01)
  G01P 13/00 (2006.01)

(52) U.S. Cl.
  CPC ............... *G08B 21/02* (2013.01); *B60R 16/02* (2013.01); *G01P 13/00* (2013.01)

(58) Field of Classification Search
  CPC .......... G08B 21/02; B60R 16/02; G01P 13/00
  USPC ........................................................ 73/760
  See application file for complete search history.

(56) References Cited

U.S. PATENT DOCUMENTS

| 6,550,351 | B1* | 4/2003 | O'Reilly et al. ................. 74/335 |
| 6,779,636 | B2 | 8/2004 | Fleming |
| 8,044,788 | B2 | 10/2011 | Lundgren |
| 8,838,367 | B1* | 9/2014 | McAlister ...................... 701/110 |
| 2002/0163246 | A1* | 11/2002 | Schmitt et al. ............... 303/9.63 |
| 2006/0054052 | A1* | 3/2006 | Webster et al. ................ 105/1.5 |
| 2006/0207336 | A1* | 9/2006 | Miyazaki ........................ 73/760 |
| 2008/0221756 | A1* | 9/2008 | Miskin ............................ 701/37 |
| 2011/0167920 | A1* | 7/2011 | Rink et al. ...................... 73/760 |
| 2013/0289831 | A1 | 10/2013 | Helland |
| 2014/0278020 | A1* | 9/2014 | Neet ............................. 701/112 |

FOREIGN PATENT DOCUMENTS

WO  2007/043957 A1  4/2007

* cited by examiner

*Primary Examiner* — Faye M Fleming
(74) *Attorney, Agent, or Firm* — Jeffrey P. Calfa; Mark C. Bach

(57) ABSTRACT

A vehicle comprises at least one wheel supporting the vehicle and an engine. At least one axially rotating member operatively connects the engine with the wheel such that the wheel moves responsive to operation of the engine. At least one tag is disposed on the axially rotating member. At least one sensor is disposed on the vehicle so that the sensor can detect movement of the tag. A computer disposed on the vehicle is operatively connected with the sensor. The sensor sends a signal to the computer when the sensor detects movement of the tag. Means on the vehicle provides an operator of the vehicle with feedback indicative of movement of the vehicle.

8 Claims, 2 Drawing Sheets

VEHICLE WITH MOVEMENT SENSOR

BACKGROUND

Embodiments described herein generally relate to a vehicle with a movement sensor and a method of sensing movement of a vehicle.

A vehicle, such as a truck, a bus and the like, often includes a vehicle brake to limit movement of the vehicle. In some uses of a vehicle, it is desirable to limit movement of the vehicle to permit another operation. For example, it is desirable to limit movement of a bus while a passenger boards or departs from the bus. If the bus were to move while the passenger boards or departs from the bus, an unintended consequence, such as injury to the passenger, can occur. An operator of the bus can apply a vehicle brake to limit movement of the vehicle, e.g. bus, to reduce possibility of occurrence of an unintended consequence.

Sometimes, it is possible that, even when the vehicle brake is applied, movement of the vehicle is insufficiently limited allowing for occurrence of an unintended consequence. This could happen if, for example, the operator did not apply fully the vehicle brake, if terrain on which the vehicle is located is sloped or is slippery or any other condition that encourages movement of the vehicle. Accordingly, it is desirable to provide a vehicle with a system and method for alerting the operator to movement of the vehicle.

SUMMARY

Embodiments described herein relate to a vehicle with a movement sensor. According to one embodiment, a vehicle comprises at least one wheel supporting the vehicle and an engine. At least one axially rotating member operatively connects the engine with the at least one wheel such that the at least one wheel moves responsive to operation of the engine. At least one tag is disposed on the at least one axially rotating member. At least one sensor is disposed on the vehicle so that the at least one sensor can detect movement of the at least one tag. A computer disposed on the vehicle is operatively connected with the at least one sensor. The at least one sensor sends a signal to the computer when the at least one sensor detects movement of the at least one tag. Means on the vehicle provides an operator of the vehicle with feedback indicative of movement of the vehicle.

Another embodiment comprises a method of providing a vehicle with a movement sensor. In that method comprising, at least one wheel supporting the vehicle, an engine on the vehicle and at least one axially rotating member operatively connecting the at least one wheel with the engine on the vehicle so that the at least one wheel moves responsive to operation of the engine are provided. At least one tag is applied to the at least one axially rotating member such that the at least one tag moves responsive to movement of the at least one axially rotating member. At least one sensor is provided on the vehicle so that the at least one sensor can detect movement of the at least one tag. A computer is provided on the vehicle operatively connected with the at least one sensor. The at least one sensor sends a signal to the computer when the at least one sensor detects movement of the at least one tag. Means are provided on the vehicle for providing an operator of the vehicle with feedback indicative of movement of the vehicle. The means provides feedback to the operator of the vehicle when at least one sensor detects movement of the at least one tag.

DETAILED DESCRIPTION

Embodiments described herein provide a vehicle with a movement sensor and a method of sensing movement of a vehicle. A vehicle often has at least one wheel that supports the vehicle above a surface, such as a road, the ground and the like. The at least one wheel is operatively connected with an engine by at least one axially rotating member so that the wheel moves responsive to operation of the engine. The at least one axially rotating member can be at least one of a drive shaft and an axle. A tag is applied to the at least one axially rotating member such that the tag moves responsive to movement of the at least one axially rotating member. Another element, such as a brake drum, a rotor or the like, may be coupled to the at least one axially rotating member so that the another element rotates conjointly with the at least one axially rotating member. In such cases, the tag can be applied to the another element because movement of the tag applied to the another element corresponds to movement of the at least one axially rotating member. Thus, it is to be understood that application of the tag to the at least one axially rotating member includes application of the tag to another element coupled to the at least one axially rotating member. A sensor is disposed on the vehicle to detect movement of the tag. Movement of the tag indicates movement of the at least one axially rotating member. Movement of the at least one axially rotating member indicates movement of the vehicle. When the sensor detects movement of the tag, feedback is provided to an operator of the vehicle alerting the operator to movement of the vehicle.

Figure 1:
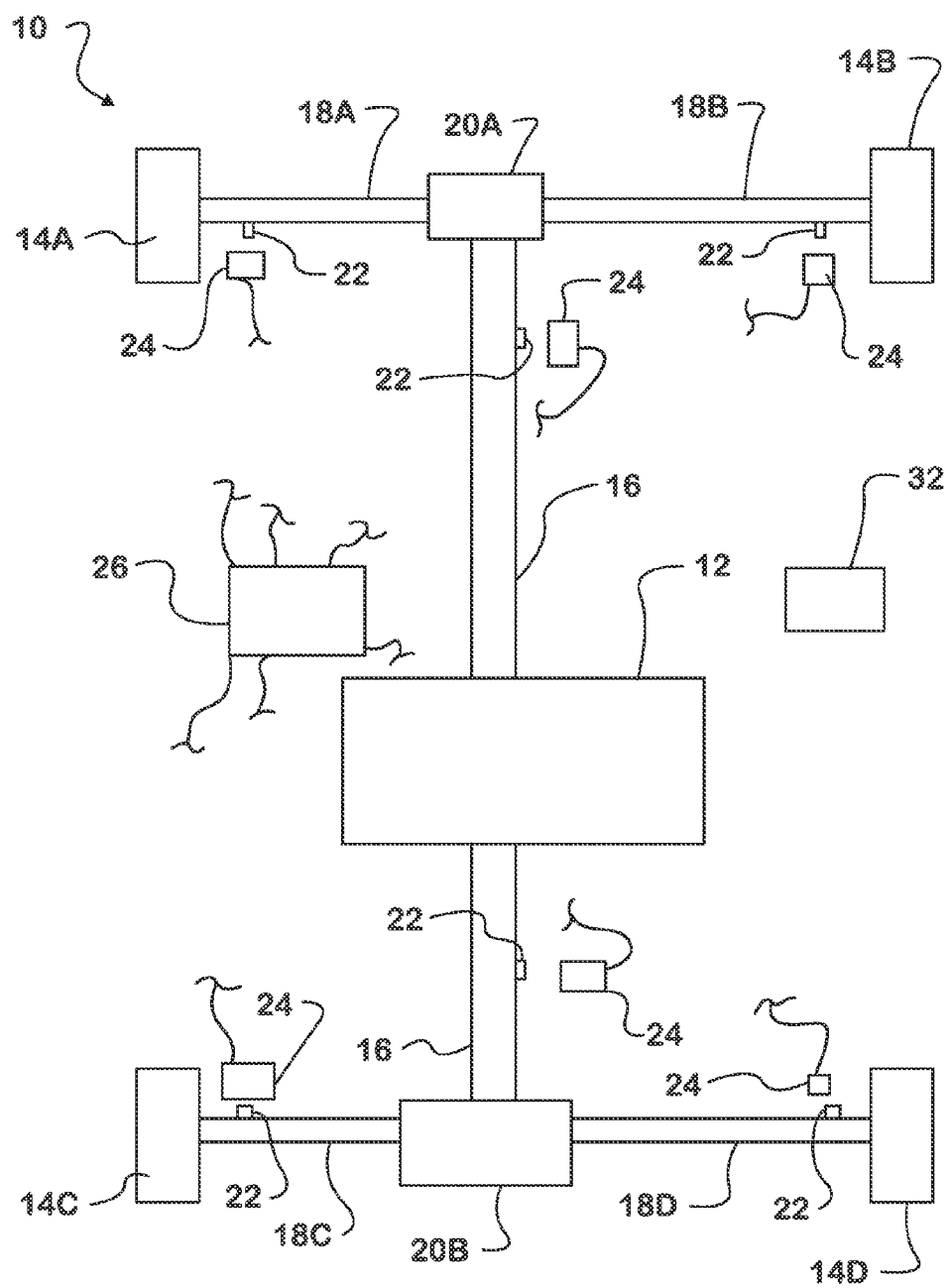
FIG. 1 is a block diagram of a portion of a vehicle having an embodiment of a vehicle with movement sensor described herein.

Referring to FIG. 1, a portion of a vehicle 10 is shown. The vehicle 10 generally comprises an engine 12 and wheels 14A, 14B, 14C and 14D. While four wheels 14A, 14B, 14C and 14D are shown, it is to be understood that the vehicle 10 may have any desired number of wheels. The engine 12 is operatively coupled to the wheels 14A, 14B, 14C and 14D such that operation of the engine 12 causes movement of the wheels 14A, 14B, 14C and 14D. Any suitable form of operative connection between the engine 12 and the wheels 14A, 14B, 14C and 14D is possible.

In the illustrated embodiment, the engine 12 is operatively coupled with a drive shaft 16 that rotates responsive to operation of the engine 12. The drive shaft 16 is an axially rotating member. The drive shaft 16 is operatively connected with an axle associated with the wheel by a coupling, such as a differential and the like. The axle is an axially rotating member. As shown, the drive shaft 16 is operatively connected with axles 18A, 18B, 18C and 18D through couplings 20 A and 20B, respectively. The couplings 20 A and 20B may be any suitable construction, such as a differential and the like. Ends of the axles 18A, 18B, 18C and 18D opposite to the ends thereof connected to the couplings 20A and 20B are attached to the wheels 14A, 14B, 14C and 14D. In this way, operation of the engine 12 causes movement of the drive shaft 16, axles 18A, 18B, 18C and 18D and wheels 14A, 14B, 14C and 14D.

At least one tag 22, such as an RFID tag, a Hall effect generator and the like, is operatively connected to at least one of the drive shaft 16 and the axles 18A, 18B, 18C and 18D such that the at least one tag 22 moves responsive to movement of the at least one of the drive shaft 16 and the axles 18A, 18B, 18C and 18D. Any desired number of tags 22 can be used. Also, more than one tag 22 can be disposed on at least one of the drive shaft 16 and the axles 18A, 18B, 18C and 18D. For instance, four tags 22 can be disposed equidistantly along a circumference of the drive shaft 16 allowing detection of a quarter axial rotation of the drive shaft 16. In the embodiment illustrated in FIG. 1, a tag 22 is connected to each of the drive shaft 16 and the axles 18A, 18B, 18C and 18D. The at least one tag 22 moves in unison with the drive shaft 16 or the axles 18A, 18B, 18C and 18D to which the at least one tag 22 is attached.

At least one sensor 24 is disposed on the vehicle 10 in appropriate position to detect movement of at least one tag 22. The sensor 24 can be any appropriate construction, such as an RFID reader, a Hall effect sensor and the like, that can detect movement of the at least one tag 22. In the illustrated embodiments, there is a sensor 24 for each tag 22. It is to be appreciated that, in some embodiments, a given sensor 24 can detect movement of more than one tag 22. The at least one sensor 24 can be any construction suitable to detect movement of the at least one tag 22.

The at least one sensor 24 operatively communicates with a computer 26, such as a body controller and the like, disposed on the vehicle 10. The at least one sensor 24 is operatively connected with the computer 26 through a wired or a wireless connection. The at least one sensor 24 sends a signal to the computer 26 when the at least one sensor 24 detects movement of the at least one tag 22. The computer 26 provides feedback to an operator of the vehicle 10 by appropriate means 32 disposed on the vehicle 10. The means may be of any suitable construction, such a light for providing a visual alarm, a speaker for providing audio alarm, combinations of means for providing visual and audio alarms and the like. The feedback is indicative of at least one sensor 24 detecting movement of at least one tag 22. Movement of at least one tag 22 is indicative of movement of the vehicle 10. Thus, if the operator of the vehicle 10 receives feedback, the operator knows that the vehicle 10 is moving. The operator can take appropriate action, such as enhancing application of a brake, to limit movement of the vehicle 10. In this way, probability of occurrence of an unintended consequence is reduced.

In some embodiments, each at least one tag 22 and/or each at least one sensor 24 may have a unique identifier, such as a code number and the like. In some embodiments, the computer 24 can add a time stamp to feedback. Thus, feedback provided by the computer 24 to the operator of the vehicle 10 can alert the operator to a precise location and time of an unintended consequence, such as slippage of the driver's side rear corner of the vehicle 10 at noon. Using these features, the feedback can provide information indicative of status of the vehicle 10, such as a worn brake lining on a given wheel 14A, 14B, 14C and 14D, a worn brake lining on the park brake, service needed to be performed on the vehicle 10, direction of vehicle 10 slippage, and the like. An operator of the vehicle 10 can use feedback as a training tool to improve his operation of the vehicle 10. The computer 24 can record feedback to comprise a log of vehicle 10 operation leading to an unintended consequence. In some embodiments, the computer 24 may, in addition to providing feedback, enable a warning, such as a light on a vehicle exterior (front, back and/or sides), an audio alarm (horn, buzzer, etc.) and the like. The computer 24 may activate a camera on the vehicle 10 and focus the camera in the direction of vehicle 10 movement. In some embodiments, the computer 24 may activate a light on the vehicle 10 interior, such as a light illuminating a park brake pedal. In some embodiments, a steering wheel of the vehicle 10 may include a vibrator that is activated by the computer 24 as a way of providing the operator of the vehicle 10 with tactile feedback. These features may be combined in any desired fashion.

Figure 2:
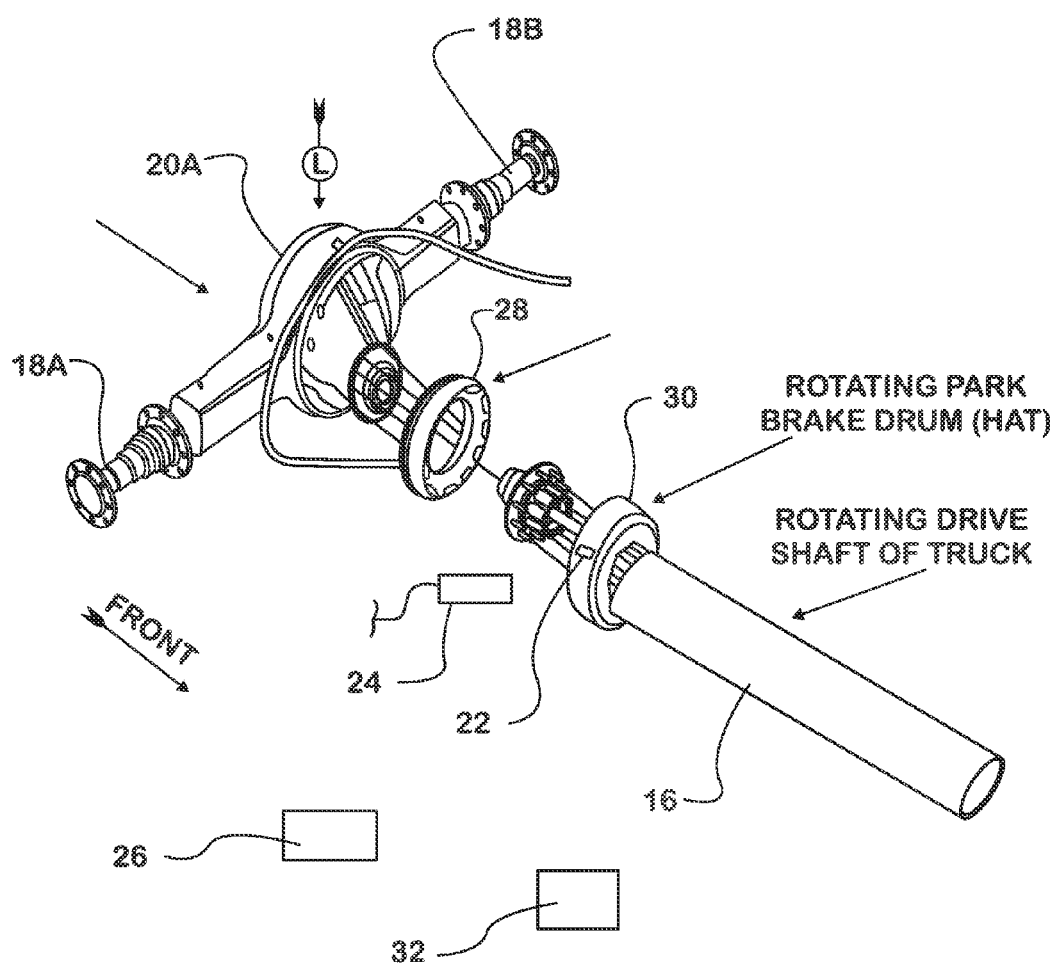
FIG. 2 is a fragmentary perspective view of a vehicle having an exemplary embodiment of a vehicle with movement sensor described herein.

Turning now to FIG. 2, an exemplary embodiment of a vehicle 10 with a movement sensor will be disclosed. The embodiment of FIG. 2 is substantially similar to the embodiment of FIG. 1 with differences noted. In FIG. 2, a particular brake, comprising drum pads 28 and a drum 30 is used to limit movement of the vehicle 10.

At least one tag 22 is disposed on a circumference of the drum 30. The drum is an axially rotating member. The drum 30 is attached to the drive shaft 16. This way, the at least one tag 22 moves responsive to movement of the drive shaft 16. At least one sensor 24 is located adjacent the drum 30 so that the at least one sensor 24 can detect movement of the at least one tag 22. Each time the at least one sensor 24 detects movement of the at least one tag 22, feedback is sent to the operator of the vehicle 10.

In some embodiments, frequency of feedback being sent to the operator of the vehicle 10 depends on the number of at least one tags 22 disposed on the circumference of the drum 30. Each time movement of an at least one tag 22 is detected by at least one sensor 24, feedback is sent to the operator of the vehicle 10. If one tag 22 is disposed on the circumference of the drum 30, then the sensor 24 can detect a one-half turn (axial rotation) of the drive shaft 16. With a 4:1 ratio differential provided by coupling 20A, a one-eight turn (axial rotation) of the axles 18A, 18B and thus the wheels 14A and 14B can be detected. If four at least one tags 22 are disposed on the circumference of the drum 30, the sensor 24 can detect a quarter turn (axial rotation) of the drive shaft 16. With a 4:1 ratio differential provided by coupling 20A, a one-sixteenth turn (axial rotation) of the axles 18A, 18B and thus the wheels 14A and 14B can be detected. It is to be appreciated that sensitivity of a method for sensing movement of the vehicle 10 can be determined by a number of at least one tags 22 disposed on an axially rotating member of the vehicle 10.

With structure of a vehicle with a movement sensor being thusly described, a method of providing a vehicle with a movement sensor is not discussed.

A vehicle 10 often has at least one wheel 14 that supports the vehicle 10 above a surface, such as a road, the ground and the like. The at least one wheel 14 is operatively connected with an engine 12 on the vehicle 10 by at least one axially rotating member so that the wheel 14 moves responsive to operation of the engine 12. The at least one axially rotating member can be at least one of a drive shaft 16 and an axle 18. At least one tag 22 is applied to the at least one axially rotating member such that the at least one tag 22 moves responsive to movement of the at least one axially rotating member. A sensor 24 is disposed on the vehicle 10 to detect movement of the at least one tag 22. Movement of the at least one tag 22 indicates movement of the at least one axially rotating member. Movement of the at least one axially rotating member indicates movement of the vehicle 10. When the sensor 24 detects movement of the at least one tag 22, feedback is provided to an operator of the vehicle 10 alerting the operator to movement of the vehicle 10.

In practice, when the operator of the vehicle 10 stops movement of the vehicle 10, the operator applies a brake to limit movement of the vehicle 10. Subsequently, if the vehicle 10 moves, the sensor 24 detect movement of the at least one tag 22. The computer 26 sends feedback indicative of movement of the vehicle 10 to the operator of the vehicle 10. The operator can take appropriate action, such as reapplying the brake, to limit movement of the vehicle 10.

- 10 Vehicle
- 12 Engine
- 14A-D Wheel
- 16 Drive shaft
- 18A, 18B Axle
- 20A, 20B Coupling
- 22 Tag
- 24 Sensor
- 26 Computer
- 28 Brake pad
- 30 Drum
- 32 Means (feedback)

What is claimed is:

1. A vehicle comprising:
    at least one wheel supporting the vehicle;
    an engine;
    at least one axially rotating member operatively connecting the engine with the at least one wheel such that the at least one wheel moves responsive to operation of the engine;
    at least one tag disposed on the at least one axially rotating member;
    at least one sensor disposed on the vehicle so that the at least one sensor can detect movement of the at least one tag;
    a computer disposed on the vehicle, the computer being operatively connected with the at least one sensor, the at least one sensor sending a signal to the computer when the at least one sensor detects movement of the at least one tag; and
    means disposed on the vehicle for providing an operator of the vehicle with feedback indicative of movement of the vehicle, wherein the at least one axially rotating member is an axle operatively connected with the at least one wheel.

2. The vehicle as defined in claim 1 wherein the at least one axially rotating member is a drive shaft operatively connected with the engine.

3. The vehicle as defined in claim 1 wherein the at least one axially rotating member has a circumference, and the at least one tag is disposed on the circumference of the at least one axially rotating member.

4. The vehicle as defined in claim 3 further comprising:
    another tag disposed on the at least one axially rotating member.

5. The vehicle as defined in claim 4 wherein the at least one tag and the another tag are disposed equidistantly along the circumference of the at least one axially rotating member.

6. The vehicle as defined in claim 1 further comprising:
    another axially rotating member operatively connected with the at least one axially rotating member.

7. The vehicle as defined in claim 6 further comprising:
    another tag disposed on the another axially rotating member; and
    another sensor disposed on the vehicle so that the another sensor can detect movement of the another tag.

8. A method of providing a vehicle with a movement sensor, the method comprising the steps of:
    providing at least one wheel supporting the vehicle;
    providing an engine on the vehicle;
    providing at least one axially rotating member operatively connecting the at least one wheel with the engine on the vehicle so that the at least one wheel moves responsive to operation of the engine, wherein the at least one axially rotating member is an axle operatively connected with the at least one wheel;
    applying at least one tag to the at least one axially rotating member such that the at least one tag moves responsive to movement of the at least one axially rotating member;
    providing at least one sensor on the vehicle so that the at least one sensor can detect movement of the at least one tag;
    providing a computer on the vehicle;
    operatively connecting the at least one sensor with the computer;
    the at least one sensor sending a signal to the computer when the at least one sensor detects movement of the at least one tag;
    providing means on the vehicle for providing an operator of the vehicle with feedback indicative of movement of the vehicle; and
    the means providing feedback to the operator of the vehicle when at least one sensor detects movement of the at least one tag.

* * * * *